(12) United States Patent
Kundu et al.

(10) Patent No.: US 11,641,693 B2
(45) Date of Patent: May 2, 2023

(54) NR-U INTERLACE-BASED PUCCH TRANSMISSION

(71) Applicant: Intel Corporation, Santa Clara, CA (US)

(72) Inventors: Lopamudra Kundu, Sunnyvale, CA (US); Yongjun Kwak, San Diego, CA (US); Gang Xiong, Beaverton, OR (US); Dae Won Lee, Portland, OR (US); Salvatore Talarico, Los Gatos, CA (US); Yingyang Li, Beijing (CN); Seunghee Han, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 17/061,987

(22) Filed: Oct. 2, 2020

(65) Prior Publication Data

US 2021/0037605 A1 Feb. 4, 2021

Related U.S. Application Data

(60) Provisional application No. 62/911,131, filed on Oct. 4, 2019.

(51) Int. Cl.
| | |
|---|---|
| *H04W 88/08* | (2009.01) |
| *H04W 76/27* | (2018.01) |
| *H04L 27/26* | (2006.01) |
| *H04W 72/0453* | (2023.01) |
| *H04W 72/0446* | (2023.01) |
| *H04W 72/04* | (2023.01) |

(52) U.S. Cl.
CPC ......... *H04W 88/08* (2013.01); *H04L 27/2607* (2013.01); *H04W 72/0413* (2013.01); *H04W 72/0446* (2013.01); *H04W 72/0453* (2013.01); *H04W 76/27* (2018.02)

(58) Field of Classification Search
CPC ............. H04W 88/08; H04W 72/0413; H04W 72/0446; H04W 72/0453; H04W 76/27; H04W 72/042; H04L 27/2607; H04L 27/0006; H04L 27/2602; H04L 5/001; H04L 5/0053; H04L 5/0094; H04L 5/0007; H04J 2013/165; H04J 13/0074
See application file for complete search history.

(56) References Cited

U.S. PATENT DOCUMENTS

| | | | | |
|---|---|---|---|---|
| 2019/0253200 | A1* | 8/2019 | Salem | ................. H04W 72/042 |
| 2021/0360591 | A1* | 11/2021 | Ji | ............................ H04L 5/001 |
| 2022/0295452 | A1* | 9/2022 | Tsai | ...................... H04L 5/0007 |

\* cited by examiner

*Primary Examiner* — Vinncelas Louis
(74) *Attorney, Agent, or Firm* — Schwegman Lundberg & Woessner, P.A.

(57) ABSTRACT

Systems and methods for interlace PUCCH transmission in 5G networks are described. The gNB sends an RRC message to a UE. The RRC message provides one or more PUCCH interlace allocations within a BW. Each PUCCH interlace allocation has a PUCCH format for each PUCCH interlace. Each PUCCH format contains a different PUCCH interlace index. The UE sends a PUCCH interlace in the BWP based on the PUCCH interlace allocation. A PUCCH in the allocated PUCCH interlace has a cyclic shift that is dependent on a resource block number in the allocated PUCCH interlace within the BWP.

19 Claims, 8 Drawing Sheets

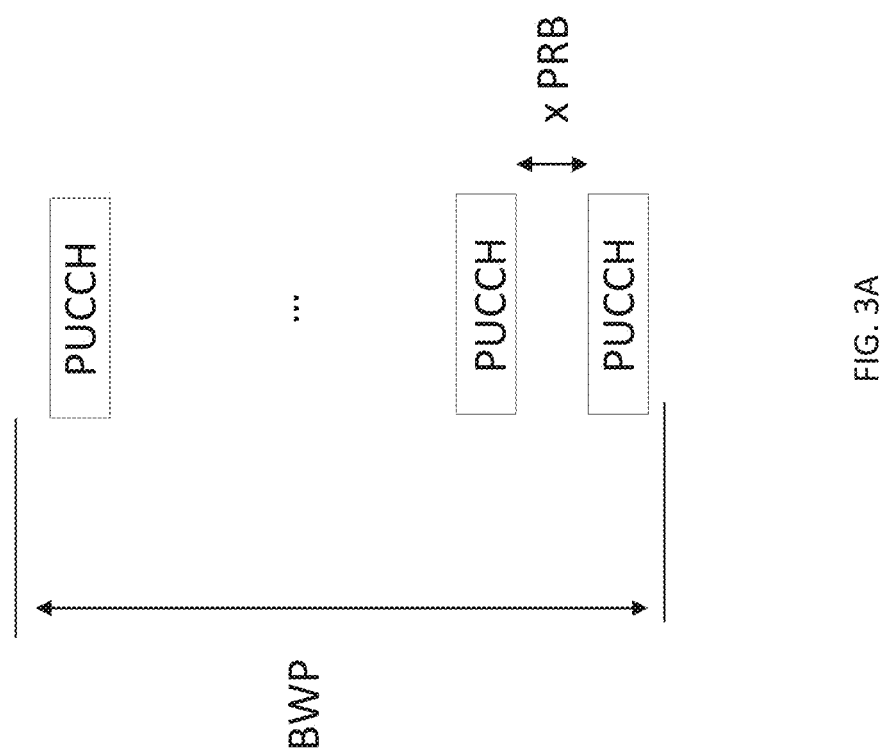

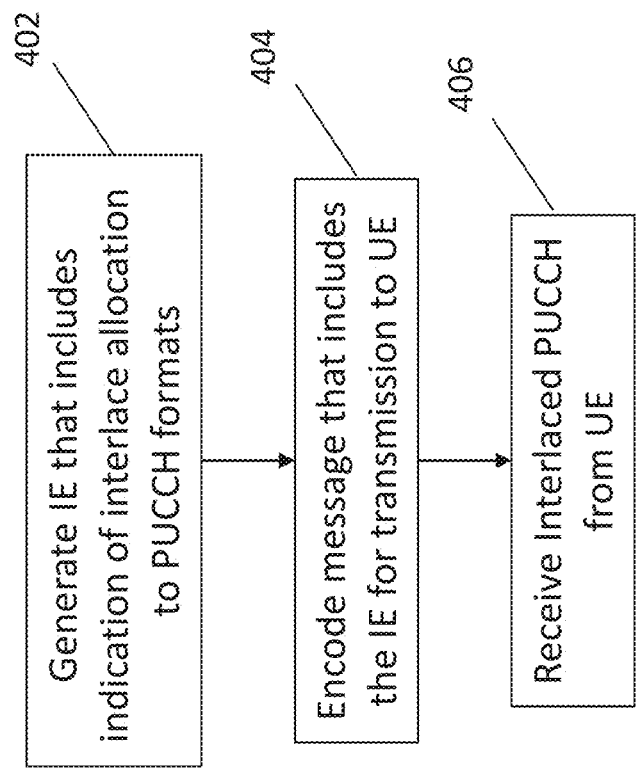

ID ALS 11,641,693 B2

NR-U INTERLACE-BASED PUCCH TRANSMISSION

PRIORITY CLAIM

This application claims the benefit of priority to U.S. Provisional Patent Application Ser. No. 62/911,131, filed Oct. 4, 2019, which is incorporated herein by reference in its entirety.

TECHNICAL FIELD

Embodiments pertain to new radio (NR)/fifth generation (5G) systems. Some embodiments relate to unlicensed band (NR-U) use in NR systems. Some embodiments relate to uplink NR-U transmissions.

BACKGROUND

The use of various types of communication systems such as 3GPP networks, has increased due to both an increase in the types of devices user equipment (UEs) using network resources as well as the amount of data and bandwidth being used by various applications, such as video streaming, operating on these UEs. The next generation wireless communication system will provide ubiquitous connectivity and access to information, as well as ability to share data, by various users and applications. NR systems are expected to have a unified framework in which different and conflicting performance criteria and services are to be met. In general, NR systems will evolve based on 3GPP LTE-Advanced technology with additional enhanced radio access technologies (RATs) to enable seamless wireless connectivity solutions. An increasing number of these solutions involve the issue of the massive increase in number of UEs in use. In particular, a number of developments have focused on the use of the unlicensed spectrum to provide additional communication channels with which the base stations (gNBs) and UEs communicate.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 3A illustrates interlaced physical uplink control channel (PUCCH) transmission in accordance with some embodiments.

FIG. 4 illustrates a method of providing a PUCCH in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
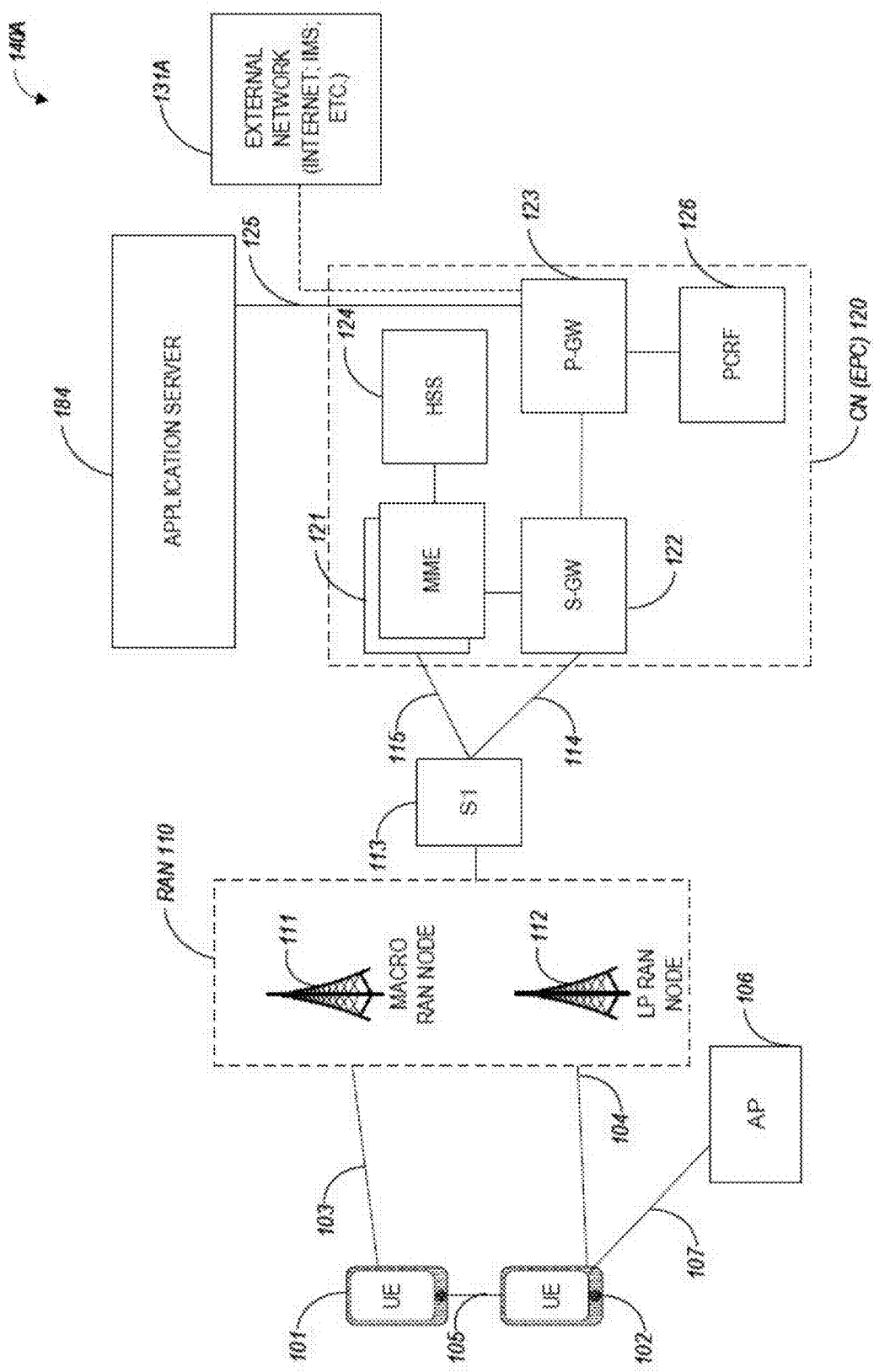
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) hut may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH); a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs). NodeBs, evolved NodeBs (eNBs), Next Generation NodeBs (gNBs), RAN nodes, and the like, and can comprise ground stations (e.g., terrestrial access points) satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LIE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LIE system in the unlicensed spectrum, according to which LTE-based technology solely operates in unlicensed spectrum without the use of an "anchor" in the licensed spectrum, called MulteFire. Further enhanced operation of LIE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via. Xn interfaces.

In some aspects, the NG system architecture can use reference points between various nodes as provided by 3GPP Technical Specification (IS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
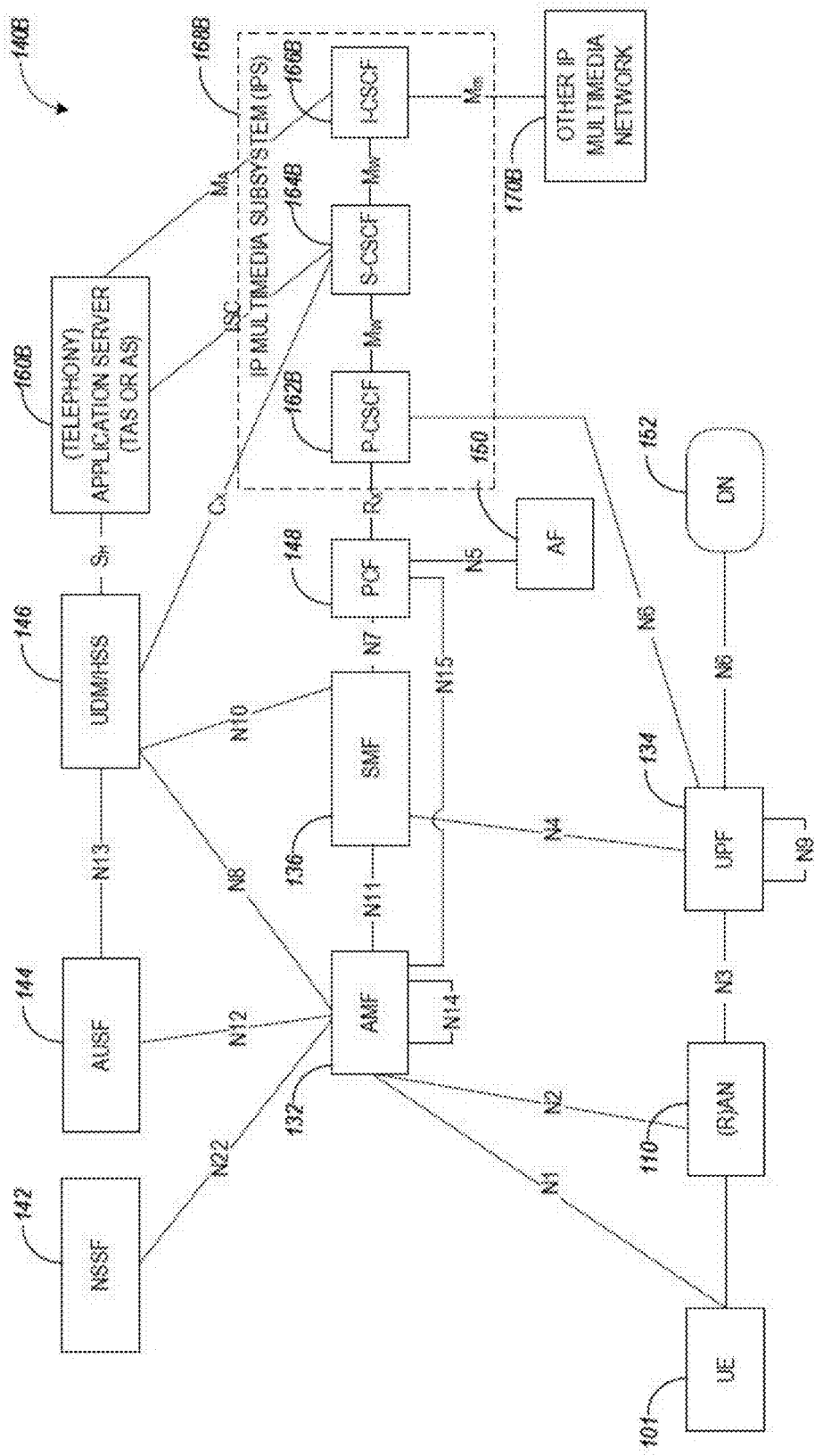
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services. Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCE (P-CSCF) 1629E, a serving CSCF (S-CSCE) 1649, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134). N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMEs, not shown), and N22 (between AMF 132 and NSSF 142, not shown). Other reference point representations not shown in FIG. 1E can also be used.

Figure 1C:
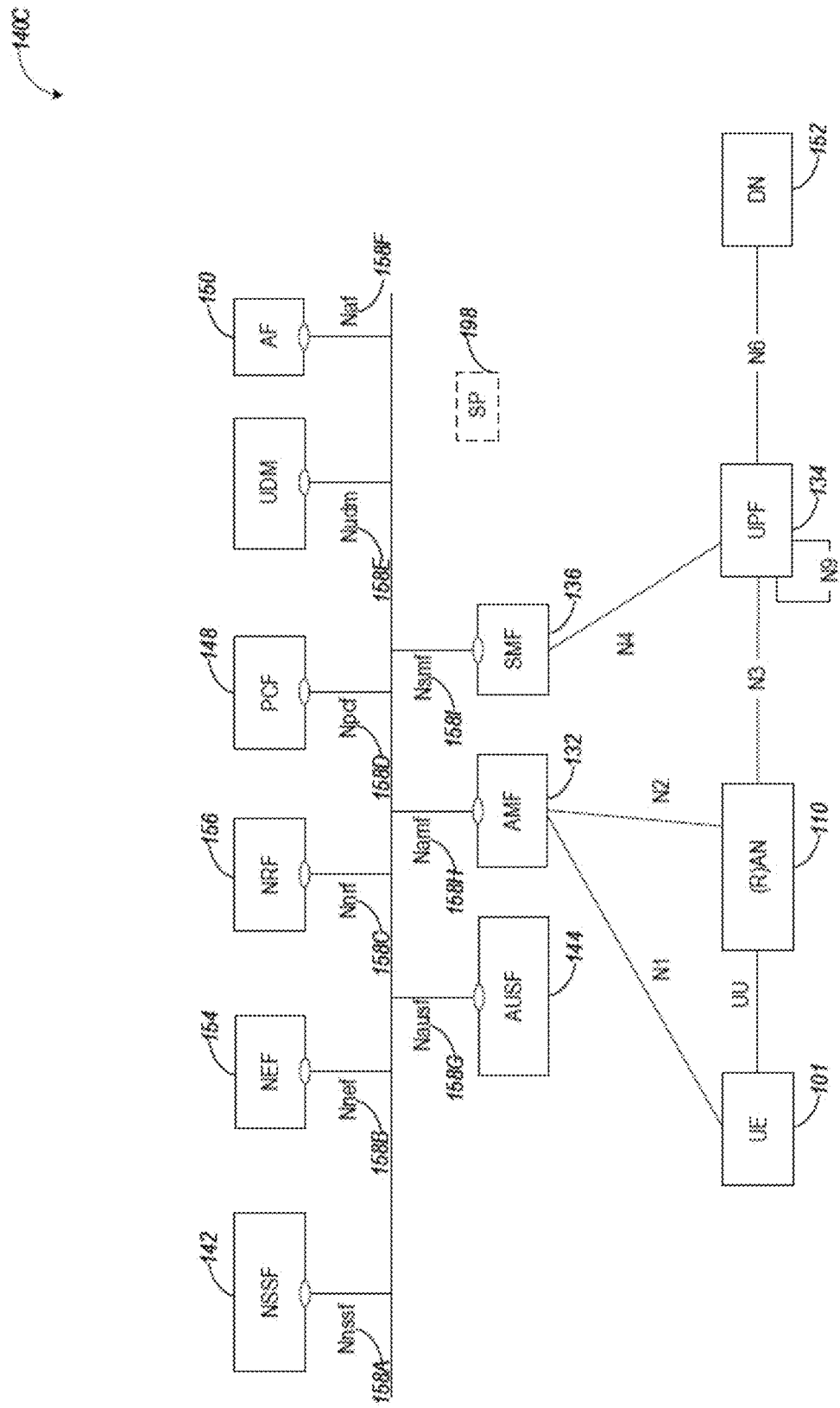
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard. 5G system architecture 140C can include the following service-based interfaces: Namf 158H (a service-based interface exhibited by the AMF 132), Nsmf 158I (a service-based interface exhibited by the SWF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
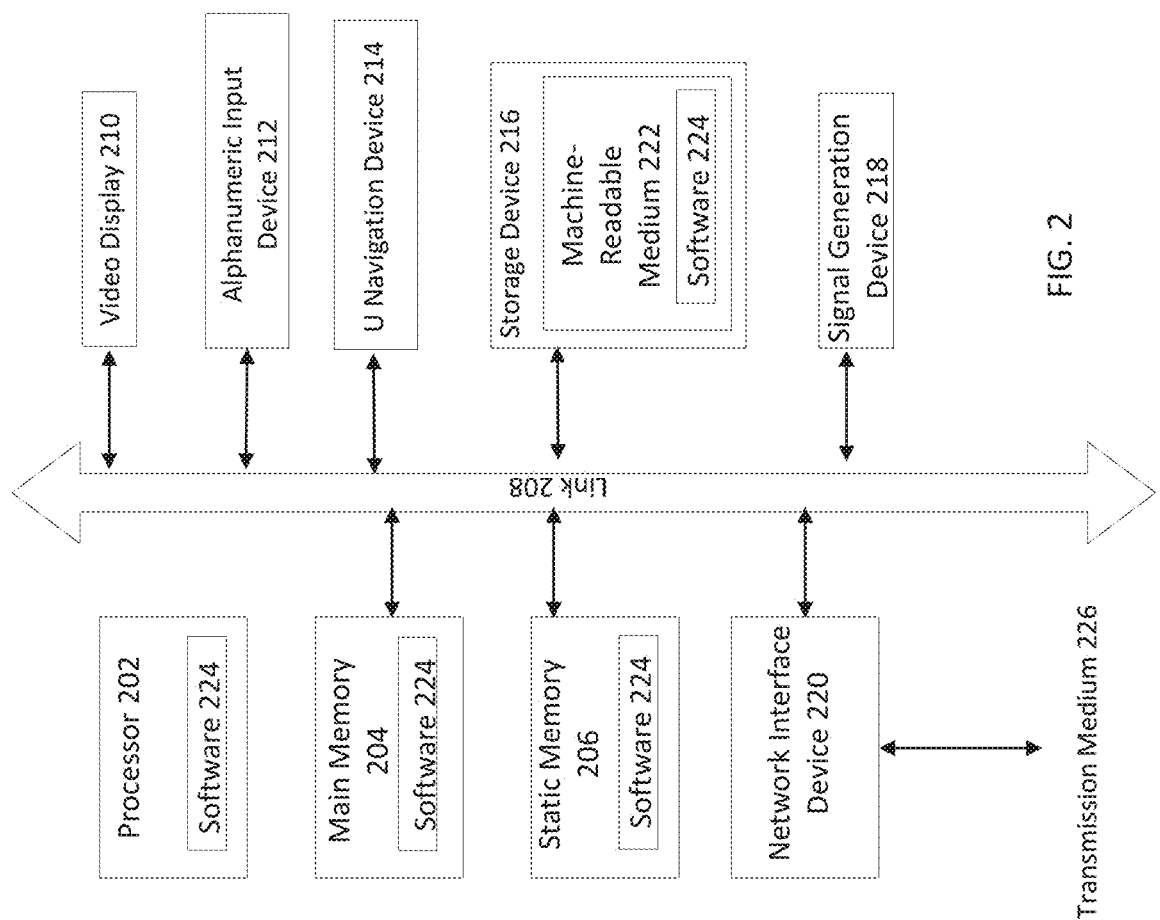
FIG. 2 illustrates a block diagram of a communication device in accordance with some embodiments.

FIG. 2 illustrates a block diagram of a communication device in accordance with some embodiments. The communication device 200 may be a LIE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

As indicated above, the explosion of network use and the relative paucity of spectrum has engendered the expansion of LTE communications into the unlicensed spectrum via Licensed Assisted Access (LAA) or other mechanisms. In particular, it is desirable to extend NR PUCCH format(s) to support physical resource block (PRB)-based frequency block-interlaced transmission. FIG. 3A illustrates interlaced PUCCH transmission in accordance with some embodiments. In FIG. 3A, the PUCCH transmissions occur over a bandwidth part (BWP) and are separated by a predetermined number of PRBs. The PUCCH delivers Uplink Control Information (UCI) which includes a Hybrid Automatic Repeat Request Acknowledgement (HARQ-ACK), Scheduling Request (SR), or Channel State Information (CSI). The PUCCH may be transmitted by the UE, for example, in response to reception of a physical downlink shared channel (PDSCH) from the gNB and may be followed by transmission of a physical uplink shared channel (PUSCH) to the gNB. Various PUCCH formats are specified (PF0-4). Mt. PUCCH supports 1-2 or 4-14 symbols. PUCCH formats 0/2 are called short-PUCCH, and can deliver the UCI using 1-2 symbols; PUCCH formats 1/3/4 are called long-PUCCH, and can deliver the UCI using 4-14 symbols. Long-PUCCH is used to improve coverage while short-PUCCH is used to reduce latency. The frequency/time-domain resources for PUCCH transmission is flexibly configurable. For a UE, Time Division Multiplexing (TDM) between long-PUCCH and short-PUCCH is also supported; for example, the UCI of a large payload, e.g. CSI, is transmitted by long-PUCCH, and the UCI of small payload, e.g. HARQ-ACK, is transmitted by short-PUCCH.

As shown in FIG. 3A, the interlaced PUCCH uses non-consecutive PRBs to meet uplink occupancy channel bandwidth requirements (OCB), which are driven by requirements for using the unlicensed hand, but may also be used in the licensed band. As shown, the interlaced PUCCH may be separated by 10 PRBs. The increase in the number of PRBs used to transmit the interlaced PUCCH, however, may result in an undesirable increase in peak-to-average power ratio/cubic metric (PAPR/CM).

PUCCH formats PF0 and PF1 are supported to include mapping to physical resources of one full interlace in 20 MHz. Various alternatives have been considered for sequence type and mapping: 1) repetition of the length-12 Rel-15 PF0 and PF1 sequence in each PRB of an interlace with a mechanism to control PAPR/CM considering cycling cyclic shifts across PRBs and/or phase rotation across PRBs of an interlace where the phase rotation is per resource element (RE) or per PRB; 2) mapping of different length-12 Rel-15 PF0 and PF1 sequences to the PRBs of an interlace based on different group number u (range is 0 . . . 29); 3) mapping of a single long sequence to the PRBs of an interlace. The impact of these alternatives due to the guard-bands is yet to be studied. Note that interlaced PF2 and 3 are not enhanced to support 1-2 bit payloads.

In particular, cycling of cyclic shifts across PRBs of the interlace may be supported for PUCCH formats. A PUCCH resource configured with interlaced mapping occupies consecutive PRBs within at least one interlace within a BWP. The PUCCH resource configuration includes the following: an indication of the allocated interlace; an indication of the location of the PUCCH resource within the allocated interlace (which may not be used for a bandwidth part of 20 MHz or less); and the number of PRBs $N_{PUCCH}$ within the allocated interlace is given by the following: $N_{PUCCH}$=10 or 11 depending on the allocated interlace for interlaced PF0/1/2 and $N_{PUCCH}$=10 for interlaced PF3.

Further determinations are to be made on whether/how an interlaced PF2/3 resource can be configured on 2 interlaces to increase the number of allocated PRBs to 20, 21, or 22 depending on the allocated interlaces; whether or not the BWP can be configured such that NPUCCH is less than 10 or 11; and the potential impact due to in-carrier guard bands. Note that the UE is not expected to be configured with PUCCH transmissions spanning multiple LBT bandwidths.

Accordingly, embodiments disclosed herein are directed to potential enhancements of the NR PUCCH formats related to cyclic shift ordering (also referred to as hopping) for interlaced PUCCH formats 0/1 and allocation of 2 interlaces to increase the number of allocated PRBs for interlaced PUCCH formats 2/3. As described in more details below, the various embodiments may be related to one more of the following: cyclic shift ordering for interlace-based PUCCH formats 0/1 for NR-U, signaling details to enable more than one interlace allocation for interlace-based PUCCH formats 2/3 for NR-U; cyclic shift ordering to enable cubic metric reduction for interlace-based PUCCH formats 0/1; and enabling more than one interlace allocation for interlace-based PUCCH formats 2/3 to ensure the maximum number of PRB allocations to be similar to NR PUCCH formats 2/3.

Cyclic Shift Ordering for Interlaced PUCCH Formats 0/1 for NR-Unlicensed

For uplink control channel of NR-U, enhancement of Rel-15 PUCCH formats PF0 and PF1 to PRB-based interlace structure is supported. The enhancement is done by repetition of the length-12 Rel-15 PF0 and PF1 sequence in each PRB of one interlace with cycling of cyclic shifts across the PRBs as a mechanism to control PAP of interlaced PF 0/1. To what extent the PAPR/CM can be reduced depends on the cyclic shift ordering. Different cyclic shift ordering patterns are disclosed in the following embodiments.

In one embodiment, the cyclic shift ordering pattern can be selected by the processing circuitry in the UE such that the cyclic shifts applied on consecutive PRBs (that is, consecutive PRBs of the interlace, which are separated by PRBs that are not part of the interlace) would be an integer offset from each other, i.e. cyclic shift applied on the i-th sequence mapped on one PRB of an interlace can be derived from the cyclic shift applied on the $0^{th}$ sequence (corresponding to i=0) mapped on the lowest indexed PRB within the allocated bandwidth of the interlace. In other words, if there are N PRBs within the allocated bandwidth of an interlace, then N sequences will be mapped on those N PRBs, with the sequences being numbered as i=0, 1, ... N-1 with i=0 corresponding to the sequence mapped on the lowest indexed PRB within the allocated interlace bandwidth, i=1 corresponding to the sequence mapped on the next PRB within the allocated bandwidth of the interlace, and so on. These N sequences may either correspond to the same base sequence index, or different base sequence indices.

For example, the cyclic shift applied on the i-th sequence mapped on an interlace, denoted by $\alpha_{l,i}$ can vary as:

$$\alpha_{l,i} = \frac{2\pi}{N_{SC}^{RB}}((m_0 + m_{CS} + n_{CS}(n_{s,f}^\mu, l+l') + \Delta_{CS,i}) \bmod N_{SC}^{RB})$$

$$= \frac{2\pi}{N_{SC}^{RB}}(\alpha_{l,0} + \Delta_{CS,i}) \bmod N_{SC}^{RB}$$

Where:
$n_{s,f}^\mu$ is the slot number in the radio frame
l is the OFDM symbol number in the PUCCH transmission where l=0 corresponds to the first OFDM symbol of the PUCCH transmission,
l' is the index of the OFDM symbol in the slot that corresponds to the first OFDM symbol of the PUCCH transmission in the slot given by 3GPP TS 38.213 V15.5.0
$m_0$ is an interlace index offset given by 3GPP TS 38.213 V15.5.0 for PUCCH format 0 and 1
$m_{cs}$=0 except for PUCCH format 0 when it depends on the information to be transmitted according to subclause 9.2 of 3GPP TS 38.213 V15.5.0.
$N_{SC}^{RB}$ is the number of subcarriers per PRB (=12)
i is the sequence number within an interlace, i=0, 1, 2, ....
$\Delta_{CS,i}$ is a non-zero positive integer for i>0 and $\Delta_{CS,i}$=0 for i=0
The function $n_{cs}(n_{s,f}^\mu, l)$ is given by:

$$n_{cs}(n_{s,f}^\mu, l) = \sum_{m=0}^{7} 2^m (8 N_{symb}^{slot} n_{s,f}^\mu + 8l + m)$$

where the pseudo-random sequence c(i) is defined by subclause 5.2.1 of 3GPP TS 38.211 V15.5.0.
In one option, $\Delta_{CS,i}$ can be a linear function of sequence number i, i.e.

$$\Delta_{CS,i} = i * \Delta_{CS,offset}$$

where $\Delta_{CS,offset}$ is a fixed integer value. As one example, $\Delta_{CS,offset}$ can be chosen from the set of values {1, 2, ..., $N_{SC}^{RB}$-1}. Note that $\Delta_{CS,i}$=0 for i=0, irrespective of $\Delta_{CS,offset}$, which means the cyclic shift applied on the first sequence mapped on the interlace with sequence number is $\alpha_{l,0} \bmod N_{SC}^{RB}$, without any offset.

TABLE 1

Cyclic shift pattern for different values of $\Delta_{CS,offset}$, with $\alpha_{l,0}$ = 0 and N = 10

| | ($\alpha_{l,0}$ + $\Delta_{CS,i}$)mod$N_{SC}^{RB}$ | | | | | | | | | |
|---|---|---|---|---|---|---|---|---|---|---|
| $\Delta_{CS,offset}$ | $\Delta_{CS,0}$ | $\Delta_{CS,1}$ | $\Delta_{CS,2}$ | $\Delta_{CS,3}$ | $\Delta_{CS,4}$ | $\Delta_{CS,5}$ | $\Delta_{CS,6}$ | $\Delta_{CS,7}$ | $\Delta_{CS,8}$ | $\Delta_{CS,9}$ |
| 1* | 0 | 1 | 2 | 3 | 4 | 5 | 6 | 7 | 8 | 9 |
| 2 | 0 | 2 | 4 | 6 | 8 | 10 | 0 | 2 | 4 | 6 |
| 3 | 0 | 3 | 6 | 9 | 0 | 3 | 6 | 9 | 0 | 3 |
| 4 | 0 | 4 | 8 | 0 | 4 | 8 | 0 | 4 | 8 | 0 |
| 5* | 0 | 5 | 10 | 3 | 8 | 1 | 6 | 11 | 4 | 9 |
| 6 | 0 | 6 | 0 | 6 | 0 | 6 | 0 | 6 | 0 | 6 |
| 7* | 0 | 7 | 2 | 9 | 4 | 11 | 6 | 1 | 8 | 3 |
| 8 | 0 | 8 | 4 | 0 | 8 | 4 | 0 | 8 | 4 | 0 |
| 9 | 0 | 9 | 6 | 3 | 0 | 9 | 6 | 3 | 0 | 9 |
| 10 | 0 | 10 | 8 | 6 | 4 | 2 | 0 | 10 | 8 | 6 |
| 11* | 0 | 11 | 10 | 9 | 8 | 7 | 6 | 5 | 4 | 3 |

TABLE 1 shows an example of cyclic shift pattern with $\alpha_{l,0}=0$, $\Delta_{CS,i}=i*\Delta_{CS,offset}$, N=10 and i=0, 1, ..., N−1. For $\alpha_{l,0}>0$, a constant offset would be added to each elements of the table, with the difference between $\Delta_{CS,i+1}$ and $\Delta_{CS,i}$ remaining the same for all i, irrespective of the value of $\alpha_{l,0}$. Also, from the above table, it is evident that for some values of $\Delta_{CS,offset}$, $\Delta_{CS,i}$'s are distinct for all i's, as indicated by the $\Delta_{CS,offset}$* rows in the table, whereas for other values of $\Delta_{CS,offset}$, $\Delta_{CS,i}$'s may repeat, as shown by the entries in the table in boldface.

Figure 3B:
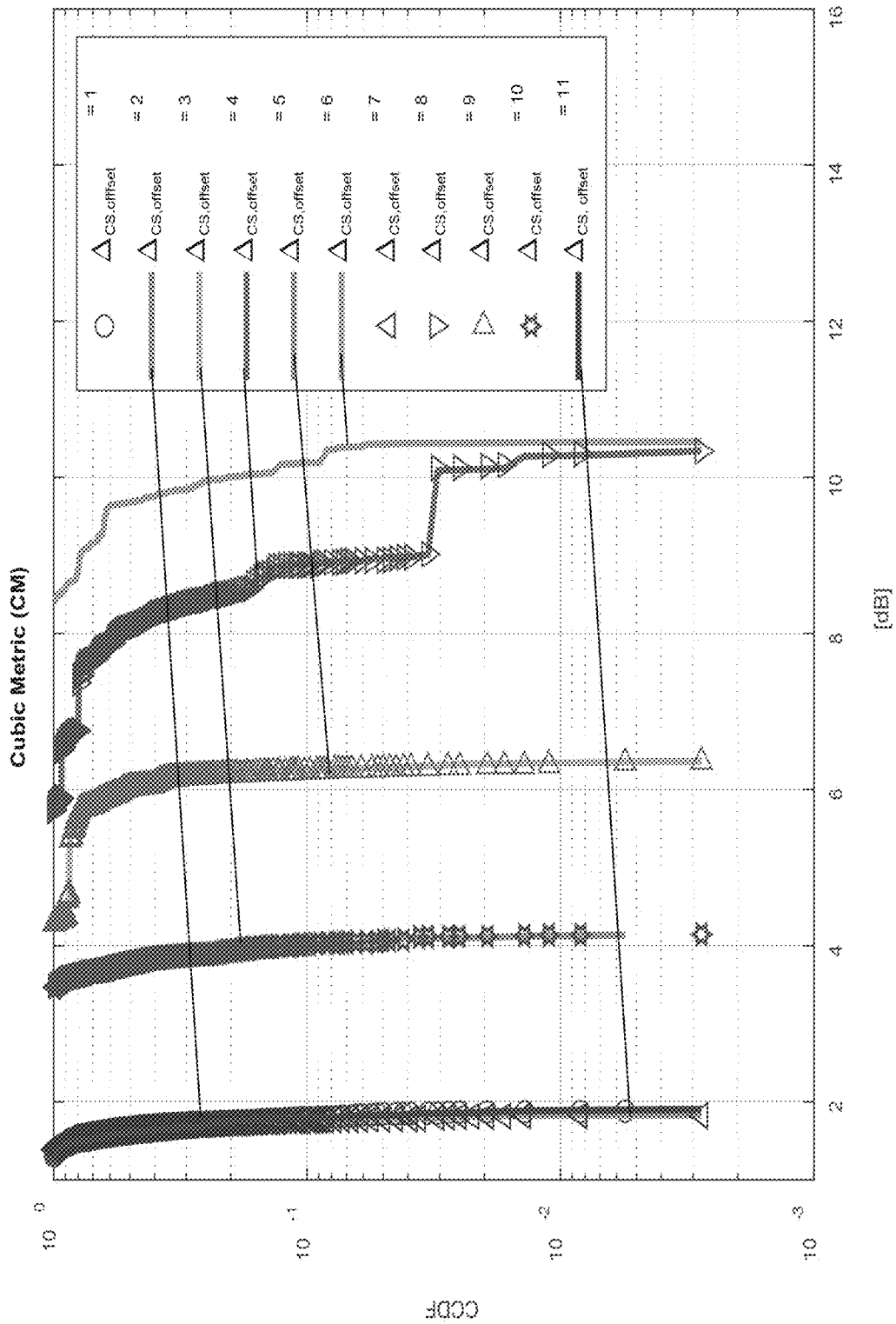
FIG. 3B illustrates a cubic metric for different cyclic shift offsets of the PUCCH transmission of FIG. 3A in accordance with some embodiments.
Figure 3C:
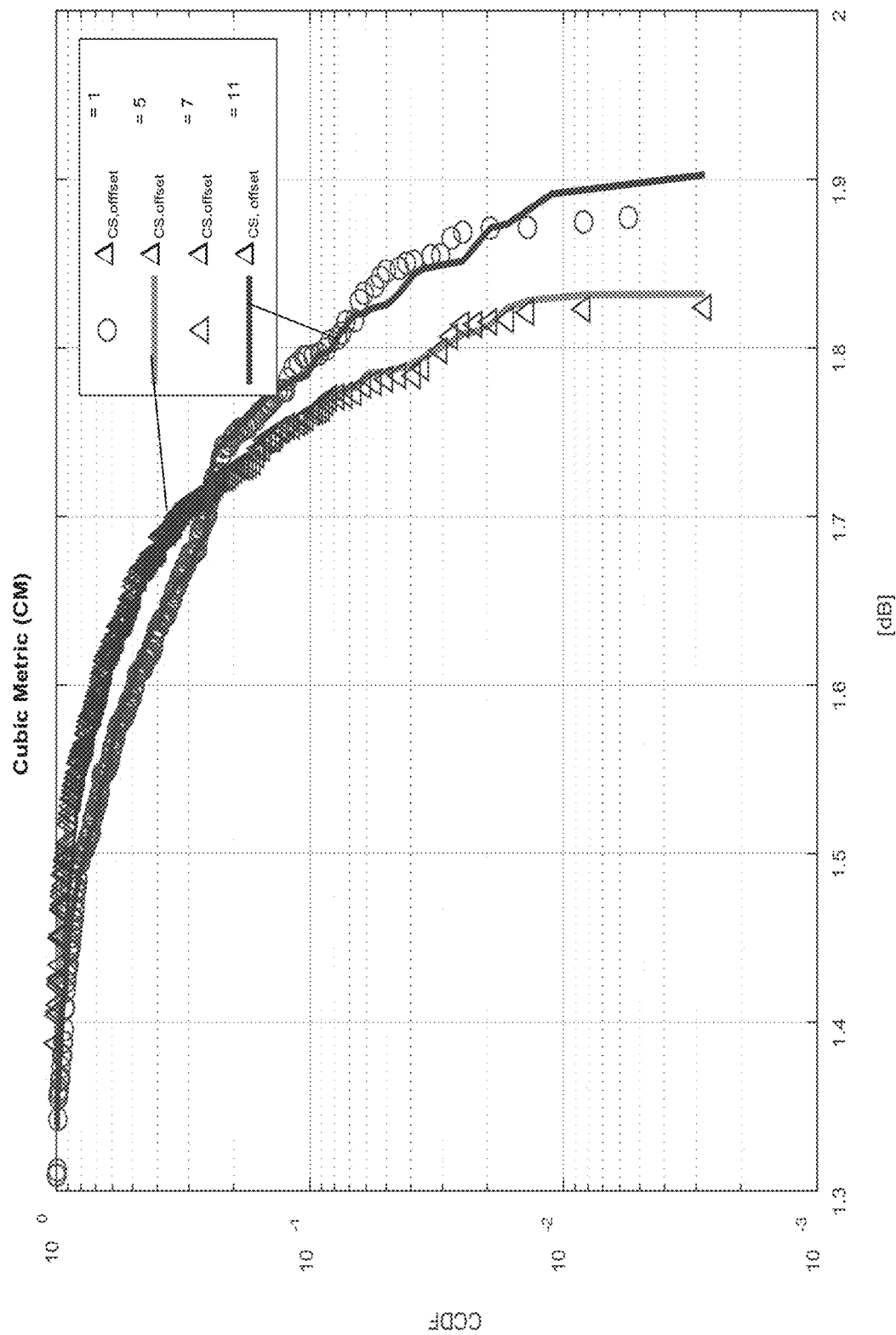
FIG. 3C illustrates a magnified view of a portion of the cubic metric of FIG. 3B in accordance with some embodiments.

In another option, certain restrictions can be imposed on the set of allowed values of $\Delta_{CS,offset}$. For example, to ensure that $\alpha_{l,i}$ generated for all values of i are distinct, $\Delta_{CS,offset}$ can be restricted to be chosen from the set $\{1,5,7,11\}$ for $N_{SC}^{RB}=12$, as shown in TABLE 1 with the starred rows, for which $\Delta_{CS,i}$'s are distinct for all i's. This additional restriction may reduce PAPR/CM, as is demonstrated in the FIGS. 3B and 3C. FIG. 3B illustrates a cubic metric for different cyclic shift offsets in accordance with some embodiments. FIG. 3C illustrates a magnified view of a portion of the cubic metric of FIG. 3B in accordance with some embodiments. In particular, FIG. 3C is a magnified version of the portion of FIG. 3B that corresponds to the curves with lowest CM values, i.e. with $\Delta_{CS,offset}=\{1,3,5,7\}$. $\Delta_{CS,offset}=\{1,3,5,7\}$ may be set to a particular value of the resource block number within the interlace using RRC signaling such as any of the higher-layer parameters useInterlacePUCCH-PUSCH in BWP-UplinkCommon or useInterlacePUCCH-PUSCH in BWP-UplinkDedicated.

In another option, $\Delta_{CS,i}$ can be chosen from a lookup table with dimension $N_{SC}^{RB} \times (N-1)$, where a pattern of $\Delta_{CS,i}$ for i=1, 2, ..., N−1 is chosen based on the value of $\alpha_{l,0} \bmod N_{SC}^{RB}$ (ranging between 0 and ($N_{SC}^{RB}-1$)), which determines the row of the table corresponding to which the (N−1) column entries give the pattern for $\Delta_{CS,i}$ for i=1, 2, ..., N−1. $\Delta_{CS,0}$ is set to be 0, such that on the first sequence mapped on the interlace with sequence number #0, the cyclic shift applied is always $\alpha_{l,0} \bmod N_{SC}^{RB}$. Similarly, the lookup table can be of dimension (N−1)×$N_{SC}^{RB}$, in which case the value of $\alpha_{l,0} \bmod N_{SC}^{RB}$ will choose a column of the table corresponding to which the entries in all (N−1) rows will give the pattern for $\Delta_{CS,i}$ for i=1, 2, ..., N−1. $\Delta_{CS,i}$ can be generated based on a predefined rule and can be a function of other system parameters like PRB index (i), symbol number (l), slot number ($n_{s,f}^\mu$), symbol index (l'), base sequence number (u) etc.

In another option, $\Delta_{CS,i}$ can be a random pattern, generated for each distinct value of $\alpha_{l,0} \bmod N_{SC}^{RB}$ such that all values of $\Delta_{CS,i}$ corresponding to a given $\alpha_{l,0} \bmod N_{SC}^{RB}$ are distinct. For example, $\alpha_{l,0} \bmod N_{SC}^{RB}$ can be any value within the set $\{0, 1, 2, ..., N_{SC}^{RB}-1\}$. For each of these values, $\Delta_{CS,i}$ for i>0 can be chosen in $$\frac{(N_{SC}^{RB}-1)!}{(N_{SC}^{RB}-N)!}$$

ways and out of these patterns, one can be chosen based on minimum CM/PAPR criteria. A lookup table can be formed with the selected patterns of $\Delta_{CS,i}$ corresponding to each value of $\alpha_{l,0} \bmod N_{SC}^{RB}$ within the set $\{0, 1, 2, ..., N_{SC}^{RB}-1\}$.

In another embodiment, $\Delta_{CS,i}$ can be chosen based on the base sequence index (u) and for each base sequence index. $\Delta_{CS,i}$ is optimized over all possible values of $\alpha_{l,0} \bmod N_{SC}^{RB}$ to minimize CM/PAPR. The cyclic shift pattern $\alpha_{l,i}$ may vary across different base sequence indices(u), where, as one example, u=0, 1, ..., 29.

In another embodiment, $\Delta_{CS,i}$ can be defined as a function of one or more of the following parameters: symbol index, slot index, and PRB index within an interlace. This may help in randomizing interference for PUCCH transmission.

In one example, $\Delta_{CS,i}$ can be given by:

$$\Delta_{CS,i} = \sum_{m=0}^{7} 2^m c(8N_{symb}^{slot}n_{s,f}^\mu + 8l + m)$$

where the pseudo-random sequence c(i) is defined by subclause 5.2.1 of 3GPP TS38.211 V15.5.0. The pseudo-random sequence generator shall be initialized with $c_{init}=n_{ID}$, where nip is given by the higher-layer parameter hoppingId if configured, otherwise $n_{ID}=N_{ID}^{cell}$.

In another embodiment, $\Delta_{CS,i}$ can be defined as:

$$\Delta_{CS,i}=(A*i+B) \bmod N,$$

where A=$\{5,9,11,13\}$, B=$\{1,3,5,7,9,11,13,15\}$ and N=$N_{SC}^{RB}$ is the sequence length.

In one option, in order to randomize $\Delta_{CS,i}$, its dependency on $n_{ID}$ can be incorporated, where $n_{ID}$ is given by the higher-layer parameter hoppingId if configured, otherwise $n_{ID}=N_{ID}^{cell}$.

As an example, $\Delta_{CS,i}$ can be formed as follows:

$$\Delta_{CS,i}=(A*i+B+n_{ID}) \bmod N$$

where N=$N_{SC}^{RB}$ is the sequence length.

In another option, in order to further randomize $\Delta_{CS,i}$, a circular shift can be applied to $\Delta_{CS,i}$, which has dependencies on $n_{ID}$, $N_{symb}^{slot}$ and $n_{s,f}^\mu$. For example, $\Delta_{CS,i}$, can be generated as follows:

$$\Delta_{CS,i}=\text{cirshift}((A*i+B)+n_{ID},N_{symb}^{slot}n_{s,f}^\mu) \bmod N.$$

In another embodiment, $\Delta_{CS,i}$ can be optimized over all base sequences (u) and all possible values of $\alpha_{l,0} \bmod N_{SC}^{RB}$ to minimize PAPR/CM. As one example, $\Delta_{CS,i}=i*\Delta_{CS,offset}$, where $\Delta_{CS,offset}$ is chosen such that $$\alpha_{l,i} = \frac{2\pi}{N_{SC}^{RB}}(\alpha_{l,o} + \Delta_{CS,i}) \bmod N_{SC}^{RB}$$

is optimized for all possible values of $\alpha_{l,0} \bmod N_{SC}^{RB}$ and all base sequence indices (u). For example, $\Delta_{CS,offset}=\{5,7\}$ minimizes PAPR/CM over all base sequence indices and all possible values of $\alpha_{l,0} \bmod N_{SC}^{RB}$ as can be seen from FIGS. 3B and 3C.

Allocation of More than One Interlace for Interlaced PUCCH Formats 2/3 for NR-Unlicensed In one embodiment, to enable allocation of one interlace to PUCCH formats, an RRC parameter, say interlaceAllocation-r16 can be added to PUCCH-Config information element (IE) under the RRC parameter PUCCH-Resource, which can take either integer values (0, 1, ..., N−1), or enumerated values, say r0, r1, ..., r(N−1); where N is the number of interlaces. For example, N=10 for 15 KHz SCS, N=5 for 30 KHz SCS etc.

```
Option 1: interlaceAllocation-r16 takes enumerated value
PUCCH-Resource ::=                    SEQUENCE {
    interlaceAllocation-r16           ENUMERATED {r0, r1,
r2, r3, r4, r5, r6, r7, r8, r9}
    pucch-ResourceId                  PUCCH-ResourceId,
    startingPRB                       PRB-Id,
    intraSlotFrequencyHopping         ENUMERATED
{ enabled } OPTIONAL, -- Need R
    secondHopPRB                      PRB-Id
OPTIONAL, -- Need R
    format                            CHOICE {
        format0                           PUCCH-format0,
        format1                           PUCCH-format1,
        format2                           PUCCH-format2,
        format3                           PUCCH-format3,
        format4                           PUCCH-format4
    }
}
Option 2: interlaceAllocation-r16 takes integer value
PUCCH-Resource ::=                    SEQUENCE {
    interlaceAllocation-r16           INTEGER (0..9)
    pucch-ResourceId                  PUCCH-ResourceId,
    startingPRB                       PRB-Id,
    intraSlotFrequencyHopping         ENUMERATED
{ enabled }
OPTIONAL, -- Need R
    secondHopPRB                      PRB-Id
OPTIONAL, -- Need R
    format                            CHOICE {
        format0                           PUCCH-format0,
        format1                           PUCCH-format1,
        format2                           PUCCH-format2,
        format3                           PUCCH-format3,
        format4                           PUCCH-format4
    }
}
```

In one option, a second interlace allocation for PUCCH formats 2/3 can be indicated by introducing an additional RRC parameter, say additionaInterlaceAllocation-r16 under PUCCH-format2 and PUCCH-format3, which may take integer values 0 and 1, where 0 indicates that no additional interlace is allocated and 1 indicates the interlace index immediately adjacent to the interlace index indicated by interlaceAllocation-r16 is allocated as the $2^{nd}$ interlace. In this case, the combined structure of two interlaces retain uniform inter-PRB separation.

```
PUCCH-format2 ::=                     SEQUENCE {
    nrofPRBs                          INTEGER (1..16),
    nrofSymbols                       INTEGER (1..2),
    startinqSymbolIndex               INTEGER (0..13),
    additionalInterlaceAllocation-r16 INTEGER (0..1)
}
PUCCH-format3 ::=                     SEQUENCE {
    nrofPRBs                          INTEGER (1..16),
    nrofSymbols                       INTEGER (4..14),
    startingSymbolIndex               INTEGER (0..10),
    additionalInterlaceAllocation-r16 INTEGER (0..1)
}
```

In another option, a second interlace allocation for PUCCH formats 2/3 can be indicated by introducing an additional RRC parameter, say additionalInterlaceAllocation-r16 under PUCCH-format2 and PUCCH-format3, which may take integer values (0, 1, . . . , N), indicating the interlace index offset of the $2^{nd}$ allocated interlace compared to the first interlace index signaled by interlaceAllocation-r16. The value of additionalInterlaceAllocation-r16 is 0 when no $2^{nd}$ interlace is allocated. Otherwise the $2^{nd}$ interlace index is determined as [(interlaceAllocation-r16+additionaInterlaceAllocation-r16) mod N]. For example, if interlaceAllocation-r16=4 and additionalInterlaceAllocation-r16=2, then interlaces with indexes 4 and (4+2) mod 10=6 (i.e. $5^{th}$ and $7^{th}$ interlaces) are be allocated from the interlace indices 0, 1, . . . , N−1, where the $1^{st}$ interlace corresponds to interlace index 0. The parameter nrofPRBs may be ignored for interlace based PUCCH resource allocation, for which UE would derive the number of PRBs based on the number of allocated interlaces and number of PRBs on each of the interlaces.

```
PUCCH-format2 ::=                     SEQUENCE {
    nrofPRBs                          INTEGER (1..16),
    nrofSymbols                       INTEGER (1..2),
    startingSymbolIndex               INTEGER (0..13),
    additionalInterlaceAllocation-r16 INTEGER (0..9)
}
PUCCH-format3 ::=                     SEQUENCE {
    nrofPRBs                          INTEGER (1..16),
    nrofSymbols                       INTEGER (4..14),
    startingSymbolIndex               INTEGER (0..10),
    additionalInterlaceAllocation-r16 INTEGER (0..9)
}
```

In another option, a second interlace allocation for PUCCH formats 2/3 can be indicated by introducing an additional RRC parameter, say additionalInterlaceAllocation-r16 under PUCCH-format2 and PUCCH-format3, which may take integer values (0, 1, . . . , N−1), indicating the interlace index of the $2^{nd}$ allocated interlace. When no $2^{nd}$ interlace is allocated, the integer value indicated to additionalInterlaceAllocation-r16 will be the same as that of interlaceAllocation-r16. Otherwise, additionalInterlaceAllocation-r16 will indicate a different interlace index than that by interlaceAllocation-r16. The other option is that additionalInterlaceAllocation-r16 is defined as optional and it is only configured when the $2^{nd}$ interlace is allocated. The parameter nrofPRBs may be ignored for interlace based PUCCH resource allocation, for which UE would derive the number of PRBs based on the number of allocated interlaces and number of PRBs on each of the interlaces.

In another option, a second interlace allocation for PUCCH formats 2/3 can be indicated by introducing an additional RRC parameter, say additionalInterlaceAllocation-r16 under PUCCH-format2 and PUCCH-format3, which may take enumerated values (r0, r1, . . . , r(N−1)), indicating the interlace index of the $2^{nd}$ allocated interlace. When no $2^{nd}$ interlace is allocated, the enumerated value indicated to additionalInterlaceAllocation-r16 will be the same as that of interlaceAllocation-r16. Otherwise, additionalInterlaceAllocation-r16 will indicate a different interlace index than that by interlaceAllocation-r16. The other option is that additionalInterlaceAllocation-r16 is defined as optional and it is only configured when the $2^{nd}$ interlace is allocated. The parameter nrofPRBs may be ignored for interlace based PUCCH resource allocation, for which UE would derive the number of PRBs based on the number of allocated interlaces and number of PRBs on each of the interlaces.

```
PUCCH-format2 ::=                     SEQUENCE {
    nrofPRBs                          INTEGER (1..16),
    nrofSymbols                       INTEGER (1..2),
    startingSymbolIndex               INTEGER (0..13),
    additionalInterlaceAllocation-r16 ENUMERATED
{r0,r1,r2,r3,r4,r5,r6,r7,r8,r9}
PUCCH-format3 ::=                     SEQUENCE {
    nrofPRBs                          INTEGER (1..16),
    nrofSymbols                       INTEGER (4..14),
    startingSymbolIndex               INTEGER (0..10),
```

```
    additionalInterlaceAllocation-r16    ENUMERATED
{r0,r1,r2,r3,r4,r5,r6,r7,r8,r9}
}
```

The options above may be extended to the case that more than 2 interlaces are allocated for a PUCCH format 2/3.

In one option, additional interlace allocations for PUCCH formats 2/3 can be indicated by introducing an additional RRC parameter, say nrofInterlaceAllocation-r16 under PUCCH-format2 and PUCCH-format3, which may take integer values (0, 1, . . . , N−1), indicating the number of the additional allocated interlaces. This parameter can be optional so that the value is not configured if a single interlace is allocated. Otherwise, indicated number of continuous interlaces from the interlace indicated by interlaceAllocation-r16 are allocated for PUCCH-format2 or PUCCH-format3. For example, if interlaceAllocation-r16=2 and additionaInterlaceAllocation-r16=3, then 3 interlaces from the $3^{rd}$ interlace to the $5^{th}$ interlace are allocated (assuming the $1^{st}$ interlace corresponds to interlace index 0). For another example, if interlaceAllocation-r16=8 and additionaInterlaceAllocation-r16=4, then 4 interlaces with indexes (8, 9, 0, 1) are allocated using modulo operation (mod N).

```
PUCCH-format2 :: =           SEQUENCE (
    nrofPRBs                 INTEGER (1..16),
    nrofSymbols              INTEGER (1..2),
    startingSymbolIndex      INTEGER (0..13),
    nrofInterlaceAllocation-r16  INTEGER (0..9)       Optional
}
PUCCH-format3 ::=            SEQUENCE {
    nrofPRBs                 INTEGER (1..16),
    nrofSymbols              INTEGER (4..14),
    startingSymbolIndex      INTEGER (0..10),
    nrofInterlaceAllocation-r16  INTEGER (0..9)       optional
}
```

In another option, additional interlace allocations for PUCCH formats 2/3 can be indicated by introducing an additional RRC parameter, say additionalInterlaceAllocation-r16 under PUCCH-format2 and PUCCH-format3, which may take integer values (0, 1, . . . , N−1), indicating the number of the additional allocated interlaces. This parameter can be optional so that the value is not configured if a single interlace is allocated. Otherwise, indicated interlaces by interlaceAllocation-r16 are allocated for PUCCH-format2 or PUCCH-format3.

```
PUCCH-format2 ::=            SEQUENCE {
    nrofPRBs                 INTEGER (1..16),
    nrofSymbols              INTEGER (1..2),
    startingSymbolIndex      INTEGER (0..13),
    additinoalInterlaceAllocation-r16   SEQUENCE (SIZE (1..9)) OF
INTEGER (0..9)      Optional
}
PUCCH-format3 ::=            SEQUENCE {
    nrofPRBs                 INTEGER (1..16),
    nrofSymbols              INTEGER (4..14),
    startingSymbolIndex      INTEGER (0..10),
    additinoalInterlaceAllocation-r16   SEQUENCE (SIZE (1..9))
OF INTEGER (0..9)     optional
}
```

In some embodiments, the UE may be configured to perform one or more processes, techniques, or methods as described herein, or portions thereof. One such process is depicted in FIG. 4, which illustrates a method of providing a PUCCH in accordance with some embodiments. For example, the process may include, at operation 402, generating an information element (IE) that includes an indication of an allocation of an interlace to PUCCH formats. The process further includes, at operation 404, encoding a message that includes the IF for transmission to a UE in an RRC message. The UE may then use the allocation to transmit the interlaced PUCCH, which is received by the gNB at operation 406. Note that as used herein, each instance of transmission of a signal (e.g., PUCCH) by a transmitting entity (e.g., UE) may first be encoded for transmission. Similarly, the receiving entity (e.g., gNB) may decode the signal after reception before further processing.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a 5$^{th}$ generation NodeB (gNB), the apparatus comprising:
    processing circuitry configured to:
        encode, for transmission to a user equipment (UE), a radio resource control (RRC) message comprising a physical uplink control channel (PUCCH) interlace allocation, the PUCCH interlace allocation providing a PUCCH resource within the PUCCH interlace allocation within a bandwidth part (BWP), and
        decode, from the UE, a PUCCH in the BWP based on the PUCCH interlace allocation, the PUCCH having a cyclic shift dependent on a resource block number of a resource block, within the PUCCH interlace allocation, used for transmission of the PUCCH; and
    memory configured to store the RRC message.

2. The apparatus of claim 1, wherein the cyclic shift within the PUCCH interlace allocation is dependent on a constant multiplied by the resource block number.

3. The apparatus of claim 2, wherein the constant is 5.

4. The apparatus of claim 3, wherein the PUCCH has a cyclic shift $\alpha_i$:

$$\alpha_i = \frac{2\pi}{N_{sc}^{RB}}((m_0 + m_{cs} + \Delta_{cs,i} + n_{cs}(n_{s,f}^{\mu}, l + l')) \bmod N_{sc}^{RB})$$

where:
   $N_{sc}^{RB}$ is a number of subcarriers per physical resource block (PRB),
   $n_{s,f}^{\mu}$ is a slot number in a radio frame ,
   l is an orthogonal frequency domain multiplexing (OFDM) symbol number in the PUCCH where l=0 corresponds to a first OFDM symbol of the PUCCH,
   l' is an index of an OFDM symbol in a slot that corresponds to the first OFDM symbol of the PUCCH in the slot,
   $m_0$ is an interlace index offset,
   $m_{cs}$=0 except for PUCCH format 0 when $m_{cs}$ depends on information to be transmitted in the PUCCH,
   $\Delta_{cs,i}$ is given by:
      $\Delta_{cs,i}$=5$n_{IRB}^{\mu}$ for PUCCH formats 0 and 1, where $n_{IRB}^{\mu}$ is the resource block number in the PUCCH interlace allocation.

5. The apparatus of claim 1, wherein the PUCCH has PUCCH format 0 or PUCCH format 1.

6. The apparatus of claim 1, wherein the cyclic shift of the PUCCH within the PUCCH interlace allocation is a linear function of the resource block number.

7. The apparatus of claim 1, wherein the PUCCH is in an unlicensed band.

8. The apparatus of claim 1, wherein the RRC message comprises the PUCCH interlace allocation that indicates multiple PUCCH interlaces in the BWP.

9. The apparatus of claim 8, wherein the RRC message comprises the PUCCH interlace allocation that indicates at most two PUCCH interlaces in the BWP.

10. The apparatus of claim 9, wherein the processing circuitry is configured to encode, for transmission to the UE, a PUCCH-Config information element comprising a PUCCH format for each PUCCH interlace, each PUCCH interlace having a different PUCCH interlace index.

11. The apparatus of claim 10, wherein the PUCCH-Config information element indicates PUCCH format 2 or PUCCH format 3 for each PUCCH interlace.

12. A non-transitory computer-readable storage medium that stores instructions for execution by one or more processors of a 5$^{th}$ generation NodeB (gNB), the instructions when executed configure the one or more processors to:
    encode, for transmission to a user equipment (UE), a radio resource control (RRC) message comprising a physical uplink control channel (PUCCH) interlace allocation for each of multiple PUCCH interlaces within a bandwidth part (BWP), the PUCCH interlace allocation providing a PUCCH resource within the PUCCH interlace allocation; and
    decode, from the UE, a PUCCH in the BWP based on the PUCCH interlace allocation, wherein the PUCCH has a cyclic shift $\alpha_1$ dependent on a resource block number of a resource block, within the PUCCH interlace allocation, used for transmission of the PUCCH.

13. The medium of claim 12, wherein the instructions when executed configure the one or more processors to encode, for transmission to the UE, a PUCCH-Config information element comprising a PUCCH format for each PUCCH interlace; each PUCCH format containing a different PUCCH interlace index.

14. The medium of claim 12, wherein the cyclic shift $\alpha_1$ of each PUCCH within the PUCCH interlace is:
    where:
       $N_{sc}^{RB}$ is a number of subcarriers per physical resource block (PRB),
       $n_{s,f}^{\mu}$ is a slot number in a radio frame,
       l is an orthogonal frequency domain multiplexing (OFDM) symbol number in the PUCCH where l=0 corresponds to a first OFDM symbol of the PUCCH,
       l' is an index of an OFDM symbol in a slot that corresponds to the first OFDM symbol of the PUCCH in the slot,
       $m_0$ is an interlace index offset,
       $m_{cs}$=0 except for PUCCH format 0 when $m_{cs}$ depends on information to be transmitted in the PUCCH,
       $\Delta_{cs,i}$ is given by:
          $\Delta_{cs,i}$=5$n_{IRB}^{\mu}$ for PUCCH formats 0 and 1, where $n_{IRB}^{\mu}$ is the resource block number in the PUCCH interlace allocation.

15. The medium of claim 14, wherein the PUCCH has PUCCH format 0 or PUCCH format 1.

16. The medium of claim 12, wherein the PUCCH is in an unlicensed band.

17. A non-transitory computer-readable storage medium that stores instructions for execution by one or more processors of a user equipment (UE), the instructions when executed configure the one or more processors to: decode, from a 5$^{th}$ generation NodeB (gNB), a radio resource control (RRC) message comprising a physical uplink control channel (PUCCH) interlace allocation, the PUCCH interlace allocation providing a PUCCH resource within the PUCCH interlace allocation within a bandwidth part (BWP); and encode, for transmission to the gNB, a PUCCH in the BWP based on the PUCCH interlace allocation, the PUCCH having a cyclic shift dependent on a resource block number of a resource block, within the PUCCH interlace allocation, used for transmission of the PUCCH.

18. The medium of claim 17, wherein the cyclic shift of the PUCCH within the PUCCH interlace allocation is a linear function of the resource block number.

19. The medium of claim 17, wherein the PUCCH interlace allocation within the bandwidth part indicates multiple PUCCH interlaces in the BWP, each PUCCH interlace having a PUCCH format, each PUCCH format containing a different PUCCH interlace index.

* * * * *

UNITED STATES PATENT AND TRADEMARK OFFICE
CERTIFICATE OF CORRECTION

PATENT NO. : 11,641,693 B2
APPLICATION NO. : 17/061987
DATED : May 2, 2023
INVENTOR(S) : Kundu et al.

It is certified that error appears in the above-identified patent and that said Letters Patent is hereby corrected as shown below:

In the Claims

In Column 19, Line 28, in Claim 1, delete "(BWP)," and insert --(BWP);-- therefor In Column 19, Line 50, in Claim 4, delete "frame ," and insert --frame,-- therefor In Column 20, Line 39, in Claim 13, delete "interlace;" and insert --interlace,-- therefor Signed and Sealed this
Twentieth Day of August, 2024

Katherine Kelly Vidal
*Director of the United States Patent and Trademark Office*